Oct. 5, 1965 B. RABINOVICI ET AL 3,210,564

NEGATIVE RESISTANCE CIRCUITS

Filed Nov. 20, 1961 4 Sheets-Sheet 1

INVENTORS
BENJAMIN RABINOVICI &
CHARLES A. RENTON
BY Carl V. Olson
ATTORNEY

NEGATIVE RESISTANCE CIRCUITS

Filed Nov. 20, 1961

INVENTORS
BENJAMIN RABINOVICI &
BY CHARLES A. RENTON
Carl V. Olson
ATTORNEY

NEGATIVE RESISTANCE CIRCUITS

Filed Nov. 20, 1961

INVENTORS
BENJAMIN RABINOVICI &
CHARLES A. RENTON
BY
Carl V. Olson
ATTORNEY

INVENTORS
BENJAMIN RABINOVICI &
CHARLES A RENTON
BY Carl V. Olson
ATTORNEY

United States Patent Office 3,210,564

Patented Oct. 5, 1965

3,210,564

NEGATIVE RESISTANCE CIRCUITS

Benjamin Rabinovici, Rego Park, and Charles A. Renton, New York, N.Y., assignors to Radio Corporation of America, a corporation of Delaware Filed Nov. 20, 1961, Ser. No. 153,327
3 Claims. (Cl. 307—88.5)

This invention relates to negative resistance circuits including amplifier devices so connected as to present certain desired current-voltage characteristics, and the invention also relates to combinations of such negative resistance circuits for the purpose of providing a converter for converting an analog input signal to a corresponding digital signal.

There are a number of known two-terminal negative resistance devices such as tunnel diodes, binistors and four-layer diodes which provide a current-voltage characteristic including two positive resistance regions separated by a negative resistance region. The current-voltage characteristics of these devices are determined by the semiconductor materials of which they are made. When a number of such negative resistance devices are to be employed in a circuit which requires that the devices have certain different or graded current-voltage characteristics, the desired devices are difficult to obtain because they may not be commercially available.

The possibility of constructing a two-terminal negative resistance circuit including two transistors has been described by J. J. Suran and F. A. Reibert in an article entitled, "Two-Terminal Analysis and Synthesis of Junction Transistor Multivibrators," appearing in the March 1956 issue of the IRE Transactions on Circuit Theory.

It is an object of this invention to provide an improved negative resistance circuit which can be constructed from readily available components to provide a desired current-voltage characteristic controllable within a wide range by an appropriate choice of circuit elements.

It is another object of this invention to provide an improved analog-to-digital converter employing a plurality of negative resistance circuits each having different current-voltage characteristics.

An example of a negative resistance circuit according to the invention includes two transistors having input and output electrodes cross coupled in the manner of a monostable multivibrator. The I–V characteristic taken between the emitter of one of the transistors and a circuit reference point presents a current-voltage characteristic including a low-current high-voltage peak, an intermediate-current negative-resistance region and a high-current low-voltage valley. The high-current characteristic is modified by a third transistor connected between the mentioned emitter circuit terminals and signal input terminals to provide a current path presenting a low impedance to input currents having a value less than a predetermined value, and to present a high impedance to input currents thereabove. The predetermined current value is greater than the current at the high-current low-voltage valley. The resulting current-voltage characteristic presented at the signal circuit input terminals is a very useful characteristic which can be tailored to particular needs by the appropriate choice of circuit elements, primarily resistors.

An example of an analog-to-digital converter according to the invention includes a number of negative resistance circuits corresponding to the number of binary bits in the digital code to which the analog signal is to be converted. Each of the negative resistance circuits includes first and second cross-coupled transistors. The analog input signal terminals are connected through a third transistor to the emitter circuit of the first of the cross-coupled transistors. Each of the negative resistance circuits present to the analog input terminals a current-voltage characteristic including a low-current high-voltage peak, an intermediate-current negative-resistance region, a high-current-low-voltage valley and a high-impedance region at a current value above the current value of said valley. Each of the negative resistance circuits is different by presenting progressively higher voltage peaks and progressively lower voltage valleys. The analog-to-digital converter also includes a fourth transistor connected across the analog input terminals in such a way as to present a parallel low-impedance path to analog input currents only at a given voltage intermediate the voltages of said peaks and the voltages of said valleys. Binary digital output signals are obtained from the respective negative resistance circuits to provide a coded output representative of an analog input current applied to the analog input terminals.

These and other objects and aspects of the invention will be apparent to those skilled in the art from the following more detailed description taken in conjunction with the appended drawings, wherein.

Figure 1:
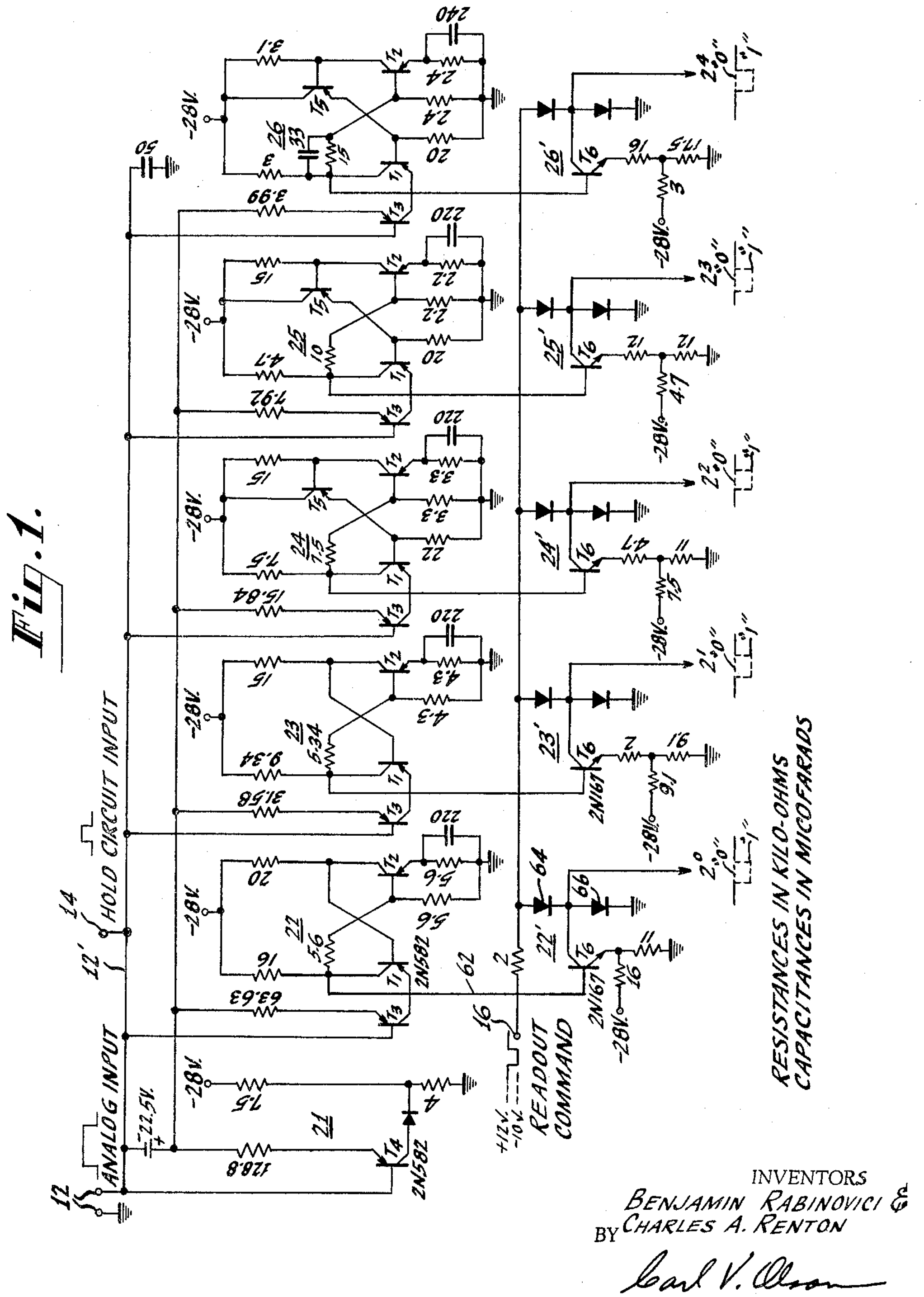
FIGURE 1 is a circuit diagram of an analog-to-digital converter constructed according to the teachings of this invention.
Figure 2:
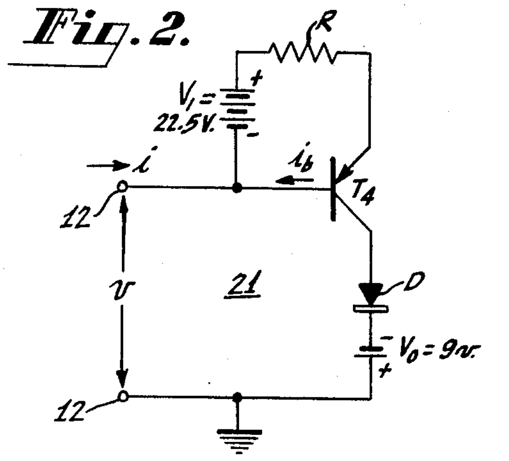
FIGURE 2 is a diagram of one circuit included in the converter of FIGURE 1.

The analog-to-digital converter of FIGURE 1 is provided with analog input terminals 12, a hold circuit input terminal 14, a readout command input terminal 16 and binary output terminals $2^0$, $2^1$, $2^2$, $2^3$ and $2^4$. The circuit of FIGURE 1 includes a first circuit 21 which includes a transistor $T_4$ and which is illustrated in FIGURE 2; a second circuit 22 which is a negative resistance circuit including transistors $T_1$, $T_2$ and $T_3$ and which is separately illustrated in FIGURE 4; a third circuit 23 which is a negative resistance circuit similar to circuit 22; and fourth, fifth and sixth circuits 24, 25 and 26 which are similar to the circuits 22 and 23 but differ therefrom by including an additional transistor $T_5$. All of the six circuits mentioned are individually connected in parallel, via an input bus 12', across the analog signal input terminals 12 and bear like reference characters for similar parts.

When an analog input signal current is applied to the analog input terminals 12, the transistors $T_1$ in the negative resistance circuits 22 through 26 assume conductive states representing the binary digital equivalent of the input signal. The conductive states of the transistors $T_1$ in negative resistance circuits 22 through 26 are read out to the output terminals $2^0$ through $2^4$ by means of "and" gates 22' through 26', upon the application of a readout command signal to the readout terminal 16.

Figure 3:
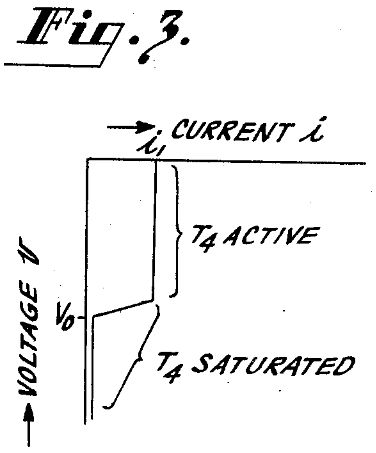
FIGURE 3 is a current-voltage characteristic of the circuit of FIGURE 2.

FIGURES 2 and 3 are now referred to in describing the construction and operation of the non-linear impedance circuit 21 in the converter of FIGURE 1. FIGURE 2 shows a known circuit including a transistor $T_4$ having a base-emitter circuit including a battery $V_1$ and a resistor R. The collector of transistor $T_4$ is connected through a diode D and a bias source such as a battery $V_0$ to ground. The diode D has its anode connected to the collector and its cathode connected to the negative terminal of the battery $V_0$. The base-collector circuit of transistor $T_4$ is connected across the analog input terminals 12 of the converter of FIGURE 1.

The transistor $T_4$ is normally saturated and has a saturation base current $i_b$ flowing out of its base electrode. When an increasing input analog current $i$ is applied to the input terminals 12, the input current reduces the base current $i_b$ until a point $i_1$ is reached at which the input current just equals the base current. This condition is reached at a point determined mainly by the voltage of the battery $V_0$. Thereafter, the circuit 21 presents a high impedance to any additional input current $i$. The non-linear current-voltage characteristic presented at the input terminals 12 is as illustrated in the chart of FIGURE 3.

Figure 4:
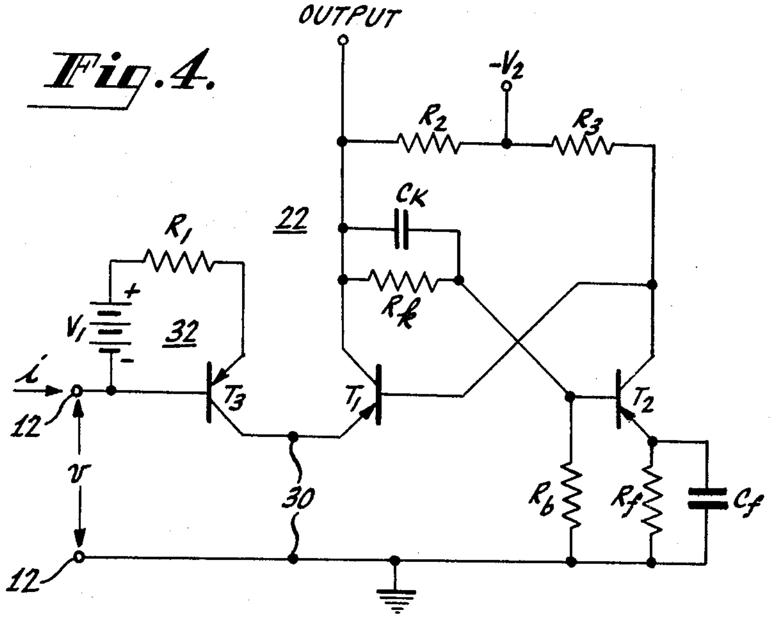
FIGURE 4 is a diagram of one of a plurality of negative resistance circuits included in the converter of FIGURE 1.
Figure 5:
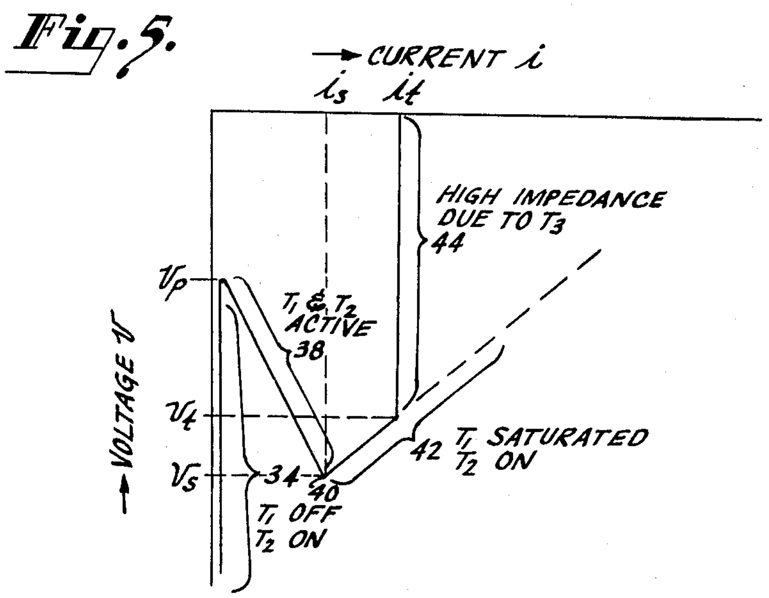
FIGURE 5 is a chart of the current-voltage characteristic of the circuit of FIGURE 4.

FIGURES 4 and 5 will now be referred in describing the construction and operation of the negative resistance circuits 22 through 26 in the converter of FIGURE 1. The circuit of FIGURE 4 includes two transistors $T_1$ and $T_2$ which have input (base) and output (collector) electrodes cross coupled so that an increase of conduction in one transistor tends to cause a reduction of conduction in the other transistor. The transistors are connected and biased in the manner of a monostable multivibrator except that the emitter circuit to transistor $T_1$ is open and provided with emitter circuit terminals 30. A non-linear impedance circuit 32, similar to the circuit 21 of FIGURE 2, is connected from the ungrounded one of the analog signal input terminals 12 to an input (emitter) electrode of transistor $T_1$. The circuit 32 provides a low impedance path for analog input currents $i$ until a certain threshold current is reached, whereupon the circuit 32 presents a very high impedance to the flow of any additional current.

The modified multivibrator circuit including transistors $T_1$ and $T_2$ presents to the emitter circuit terminals 30 a current-voltage characteristic as shown in FIGURE 5 which includes a low-current positive resistance region 34, a low-current high-voltage peak labeled $v_p$, an unstable intermediate-current negative resistance region 38, a high-current low-voltage valley 40, and a high-current positive resistance region 42. The current-voltage characteristic presented to the analog input terminals 12 is the same as has been described for the characteristic presented to terminals 30 except that a very high impedance is presented by the circuit 32 to input currents above a threshold value $i_t$. The characteristic presented to the input terminals 12 therefore includes a high-current high-impedance region 44.

The solid-line current-voltage characteristic illustrated in FIGURE 5 is a useful negative resistance characteristic. The circuit of FIGURE 4 can readily be made to provide this desired characteristic with any desired voltage value at the voltage peak 36, any desired voltage and current values at the voltage valley 40 and any desired current value in the high impedance region 44 within wide limits. Unlike the negative resistance characteristics obtained from the semi-conductor devices, the characteristic of FIGURE 5 may be tailored to particular requirements by appropriately selecting circuit elements, principally resistors, in the circuit of FIGURE 4.

A circuit according to FIGURE 4 is designed to provide a characteristic according to FIGURE 5 having desired values of peak voltage $v_p$, valley voltage $v_s$ and valley current $i_s$ by solving for $x$ and $y$ using a suitable value of bias voltage $V_2$:

$$x=\frac{v_s}{V_2-v_s} \qquad (1)$$

$$y=\frac{V_2}{V_2-v_p}-x \qquad (2)$$

Then, resistor values are determined:

$$R_2=\frac{V_2}{i_s}\cdot\frac{1-y}{1+x} \qquad (3)$$

$$R_3=\frac{R_2}{y} \qquad (4)$$

$$R_f=R_b\leq\frac{v_p}{V_2-v_p}R_3 \qquad (5)$$

$$R_k=\frac{x}{y}R_2-R_b \qquad (6)$$

The values of resistor $R_1$ and source $V_1$ are selected to provide the desired current threshold $i_t$.

Figure 6:
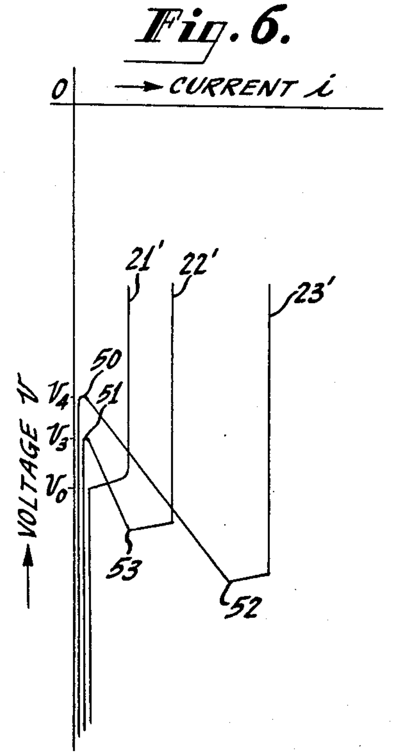
FIGURE 6 is a chart showing the superimposed individual current-voltage characteristics of the first three circuits in the converter of FIGURE 1.

FIGURE 6 shows the superimposed individual current-voltage characteristic curves 21', 22' and 23' of the first three circuits 21, 22 and 23 in the converter of FIGURE 1. (The portions of the curves closely parallel to the zero-current coordinate are spaced apart to avoid the graphical confusion that would result if the portions were superimposed on each other and on the zero-current coordinate.) The circuit 23 is provided with a characteristic 23' having a low-current voltage peak 50 which is higher than the voltage peak 51 of the circuit 22; and having a voltage valley 52 which is lower than the voltage valley 53 of the circuit 22. The following individual negative resistance circuits 24, 25 and 26 in FIGURE 1 are designed to present current-voltage characteristics with progressively higher (more positive) voltage peaks and progressively lower (more negative) voltage valleys. The non-linear impedance circuit 21 is designed to present a low impedance to current flow at a voltage $V_0$ which is at a voltage value intermediate the voltages of the peaks 50 and 51 and the valleys 52 and 53.

Figure 7:
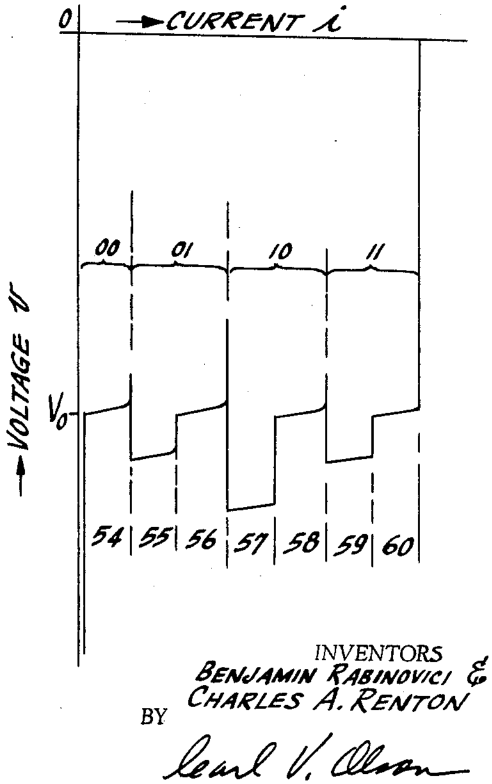
FIGURE 7 is a chart showing the composite current-voltage characteristics of the first three circuits in the converter of FIGURE 1 when the three circuits are connected in parallel across the analog input terminals.

When the first three circuits 21, 22 and 23 in the converter of FIGURE 1 are all connected in parallel to the analog input signal terminals 12, a composite current-voltage characteristic is provided having the form shown in the chart of FIGURE 7. As the analog input current $i$ is increased in the current range 54 in FIGURE 7, the non-linear impedance circuit 21 provides a low impedance path for the input current. None of the input current flows into the parallel paths provided by the negative resistance circuits 22 and 23. Analog input current in the range 54, by a quantizing process, is reserved for a "0" digital output from the analog-to-digital converter.

When input current $i$ exceeds the range 54, the voltage across the non-linear impedance circuit 21 rises to the voltage value $V_3$ (FIGURE 6) at which the negative resistance circuit 22 has a voltage peak 51 followed by a negative resistance region. Therefore, at the borderline between the current ranges 54 and 55, transients occur at a rapid rate after which, during input current range 55, all the input current $i$ flows into the negative resistance circuit 22 and none flows into the non-linear impedance circuit 21. When the input current $i$ is increased further into the current range 56, the negative resistance circuit 22 can accept no additional input current, with the result that the surplus current flows through the non-linear impedance circuit 21. For input current values in the ranges 55 and 56, the negative resistance circuit 22 is energized, that is, the transistor $T_1$ thereof is saturated, and its collector electrode provides the source of a signal indicating that the input analog signal $i$ has an equivalent digital value "01."

When the input current $i$ increases further into the current range 57, the voltage across the non-linear impedance circuit 21 and the negative resistance circuit 22 exceeds the voltage $V_4$ corresponding with the peak 50 of the characteristic of the negative resistance circuit 23. When this occurs, the circuit 23 presents a negative resistance characteristic which permits all of the input current $i$ to flow into the circuit 23, with the result that none of the input current flows into the circuits 21 and 22. Thereafter, a further increase of input current $i$ in current range 58 causes a diversion of the excess current into the non-linear impedance circuit 21. During the occurrence of input current $i$ anywhere in the current ranges 57 and 58, transistor $T_1$ in the negative resistance circuit 23 is saturated and the transistor $T_1$ in the negative resistance circuit 23 is cut off. Under these conditions the digital output signal is "10."

Similarly, a still further increase in input current $i$ in the current range 59 causes the transistor $T_1$ in both negative resistance circuits 23 and 22 to be saturated while non-linear impedance circuit 21 presents high impedance. Thereafter, current in the range 60 flows through all three of the circuits 21, 22 and 23. The input current ranges 59 and 60 thus provide the digital output "11."

The system of FIGURE 1 requires that each succeeding negative resistance circuit have a higher voltage peak, a lower voltage valley and a voltage valley and a high impedance region at doubled current values. As illustrated in FIGURE 6, the negative resistance circuits 22 and 23 are designed so that the constant current region of circuit 22 occurs at a current value twice that of the constant current region of non-linear impedance circuit 21, and the constant current region of circuit 23 occurs at a current value twice that of the constant current region of circuit 22. Additionally, the constant current regions of circuits 22 and 23 are each at a current value higher than the corresponding voltage valleys (53, 52) by an amount equal to the current value of the high impedance portion of the non-linear impedance circuit 21.

With each succeeding negative resistance circuit, the tolerances needed on the values of the circuit elements becomes stricter. The tolerances on the elements in the last three negative resistance circuits 24, 25 and 26 can be relieved by adding a transistor $T_5$, as shown in FIGURE 1, in the coupling between the base of transistor $T_1$ and the collector of transistor $T_2$. The effect of the transistor $T_5$ is to reduce the resistance at the base of transistor $T_1$. This results in a current-voltage characteristic wherein the voltage valley current is not as great as twice the value provided by the preceding circuit, but the high impedance region is still at a current value twice that of the preceding circuit. The only noticeable effect resulting from the use of a transistor $T_5$ in some of the negative resistance circuits is that the analog-to-digital converter is no longer reversible. That is, correct digital outputs are not obtained if the input analog signal starts at a maximum value and decreases to the value to be converted. The lack of reversibility is of no importance when the analog signal to be converted is sampled by a sampling circuit and the resulting time-stretched analog signal sample is applied to the analog input terminals 12.

Figure 8:
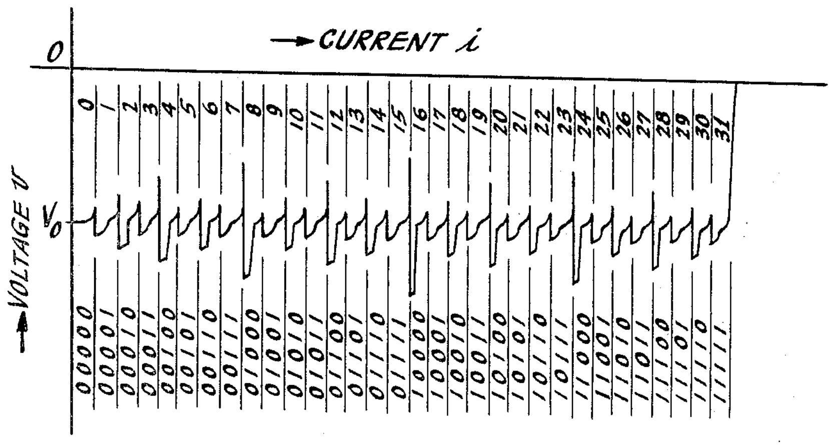
FIGURE 8 is a chart of the composite current-voltage characteristics at the input terminals of the converter of FIGURE 1.

FIGURE 8 shows the composite current-voltage characteristic presented to the analog signal input terminals 12 by all six of the parallel circuits 21 through 26. The chart of FIGURE 8 includes representations of the digital signal outputs of the five negative resistance circuits 22 through 27 at all corresponding values of input current $i$, there being $2^5$ or 32 different steps or quantized levels into which the input signal is converted. The current-voltage characteristic of FIGURE 8 was obtained by means of an oscilloscope connected to the input terminals 12 of a circuit according to FIGURE 1 and having values of circuit elements shown on the drawing.

Figure 9:
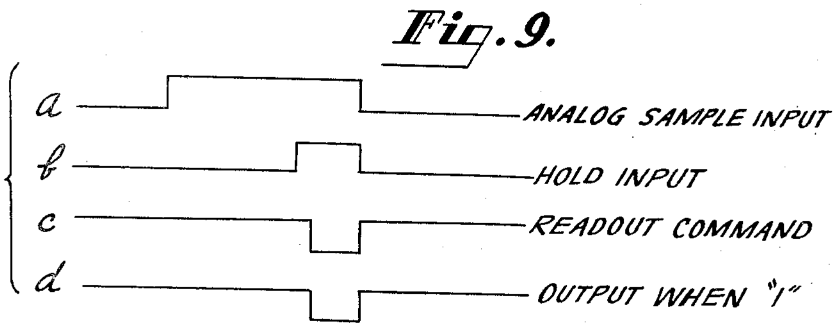
FIGURE 9 is a chart of the input, control and output signals of the converter of FIGURE 1.
Figure 10:
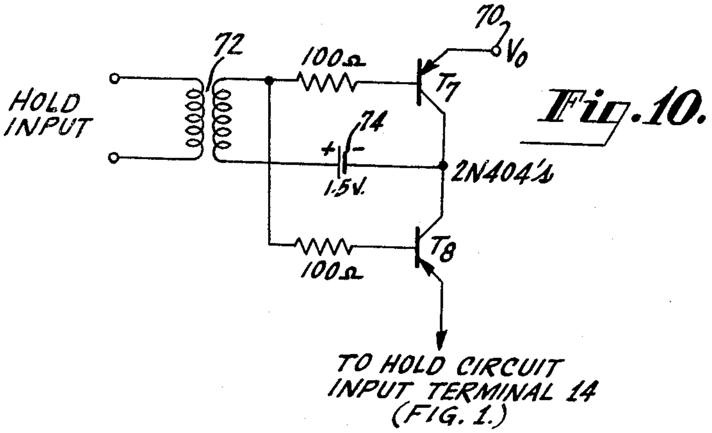
FIGURE 10 is a circuit diagram of a control circuit employed with the converter of FIGURE 1.

In the operation of the analog-to-digital converter of FIGURE 1, a prolonged or sustained sample according to FIGURE 9*a* of a varying analog signal is applied to the analog input terminals 12. A short period of time is then allowed to elapse so that transients occurring in the system can die down and leave the circuits 21 through 26 in states representing the equivalent binary output. Then a hold input signal according to FIGURE 9*b* is applied to a hold circuit, as shown in FIGURE 10, which has an output connected to the hold circuit input terminal 14 in the converter of FIGURE 1. The hold circuit of FIGURE 10 is a modified chopper switch arranged, when energized, to apply the voltage $V_0$ of a source (not shown) to the base electrodes of transistor $T_4$ and all of the transistors $T_3$. The hold circuit includes two symmetrical transistors $T_7$ and $T_8$ which, when saturated, permit a flow of current in either direction through the series-connected emitter-collector paths between the $V_0$ voltage source terminal 70 and the terminal 14. In the absence of a hold input signal to transformer 72, the source 74 (which may be a battery) provides a back bias which prevents a flow of current in the direction from collector to emitter in transistor $T_8$ and which prevents a flow of current in the direction from collector to emitter in transistor $T_7$. When a hold input signal is applied through the transformer 72 it is in a polarity opposite to that of source 74 and it has a magnitude to fully saturate the transistors $T_7$ and $T_8$. The saturated transistors provide a low impedance path between terminals 70 and 14 for the flow of current in either direction. The terminal 14 and bus 12' of the converter of FIGURE 1 is then clamped at the voltage $V_0$ of the voltage source connected to terminal 70.

Once the voltage source $V_0$ is connected to terminal 14, there can be no further changes in the state of the negative resistance circuits because the voltage source will either take up current or supply current in an amount which will fix the voltage across the input terminals 12 at $V_0$. The hold circuit will then supply to the input terminals 12 an amount of current such that the total current applied to the input bus 12' corresponds to a value in one of the alternate current ranges 54, 56, 58, 60, etc. (FIGURE 7). The total current value is maintained even though the analog input current signal itself may be removed.

During the occurrence of the hold input signal, a readout command signal according to FIGURE 9*c* is applied to the readout command terminal 16 to energize the readout circuits 22' through 26'. The readout circuits are essentially "and" gates which, when enabled by the readout command, provide outputs from those of the corresponding negative resistance circuits which are then in the "1" state with transistor $T_1$ saturated.

The "and" circuit 22' includes a transistor $T_6$ having its base electrode connected by a lead 62 to the collector electrode of transistor $T_1$ in negative resistance circuit 22. The emitter electrode of transistor $T_6$ is biased to the same voltage that the collector of transistor $T_1$ is biased. Therefore, when transistor $T_1$ is cut off, transistor $T_6$ is also just cut off or slightly conductive. When transistor $T_1$ is saturated, however, representing the digit "1," a more positive voltage is applied through lead 62 to the base electrode of transistor $T_6$, the more positive voltage being in the direction to increase conduction in transistor $T_6$. In the absence of a readout command signal, the diodes 64 and 66 are biased by the readout command source (not shown) to present a low impedance to ground and prevent the transmission of an output signal to the output terminal 20. When a negative readout command is applied to the readout terminal 16, the diodes 64 and 66 are biased to be non-conductive with the result that the output lead $2^0$ carries a signal indicative of the conduction state of transistor $T_6$, which is in turn determined by the conduction state of the transistor $T_1$.

The "and" circuits 22' through 26' permit the reading out of the states of the negative resistance circuits 22 through 26 without loading or otherwise disturbing the negative resistance circuits. The output signals from the output leads $2^0$ through $2^4$ are 0 volts when the corresponding negative resistance circuits are in the "0" states and are a negative voltage when the corresponding negative resistance circuits are in the "1" states. Other suitable "and" circuits may be employed, and may be preferred if a positive output signal corresponding to a "1" is desired.

What is claimed is:

1. A circuit comprising input terminals, a negative resistance circuit including first and second transistors each having two input electrodes and an output electrode, said first and second transistors having cross coupled input and output electrodes, said negative resistance circuit also including a non-linear impedance means connected between said input terminals and one of said input electrodes of said first transistor, said negative resistance circuit presenting to said input terminals a current-voltage characteristic including a low-current high-voltage peak, an intermediate-current negative-resistance region, a high-current low-voltage valley and a high-impedance region at a current value above the current value of said valley, and a second non-linear impedance means connected across said input terminals in such a way as to present a parallel low-impedance path to input currents only at a given voltage intermediate the voltages of said peak and valley.

2. A circuit comprising input terminals, a negative resistance circuit including first and second transistors each having two input electrodes and an output electrode, said first and second transistors having input and output electrodes cross coupled so that an increase in conduction in one transistor causes a decrease in conduction in the other transistor, said negative resistance circuit also including a third transistor connected between one of said input terminals and one of said input electrodes of said first transistor, said negative resistance circuit presenting to said input terminals a current-voltage characteristic including a low-current high-voltage peak, an intermediate-current negative-resistance region, a high-current low-voltage valley and a high-impedance region at a current value above the current value of said valley, and a fourth transistor connected across said input terminals in such a way as to present a parallel low impedance path to input currents only at a given voltage intermediate the voltages of said peak and valley.

3. A circuit comprising input terminals, a negative resistance circuit including first and second transistors having base and collector electrodes cross coupled so that an increase in conduction in one transistor causes a decrease in conduction in the other transistor, and including a third transistor having a base-collector path connected between one of said input terminals and the emitter electrode of said first transistor, said negative resistance circuit presenting to said input terminals a current-voltage characteristic including a low-current high-voltage peak, an intermediate-current negative-resistance region, a high-current low voltage valley and a high impedance region at a current value above the current value of said valley, and a fourth transistor haing a base-collector path connected in series with a diode across said input terminals in such a way as to present a parallel now impedance path to input currents only at a given voltage intermediate the voltages of said peak and valley.

References Cited by the Examiner

UNITED STATES PATENTS

| | | | |
|---|---|---|---|
| 2,655,609 | 10/53 | Shockley. | |
| 2,733,432 | 1/56 | Breckman | 340—347.1 |
| 2,869,115 | 1/59 | Doelman et al. | 340—347.1 |
| 2,882,424 | 4/59 | Wohr | 307—88.5 |
| 2,889,468 | 6/59 | Crosby | 307—88.5 |
| 3,014,663 | 12/61 | Horton et al. | 328—241 X |
| 3,016,468 | 1/62 | Moraff. | |
| 3,037,143 | 5/62 | Marley | 307—88.5 |
| 3,059,128 | 10/62 | Cramer | 307—88.5 |

OTHER REFERENCES

Suran et al.: "Two Terminal Analysis and Synthesis of Junction Transistor Multivibrators," IRE Transactions on Circuit Theory, March 1956, pages 26–35.

JOHN W. HUCKERT, *Primary Examiner.*

MALCOLM A. MORRISON, *Examiner.*